April 8, 1958    W. L. WILLCOX    2,829,837
THERMOSTATICALLY CONTROLLED VALVE FOR SUCTION RESPONSIVE DEVICES
Filed Nov. 4, 1952
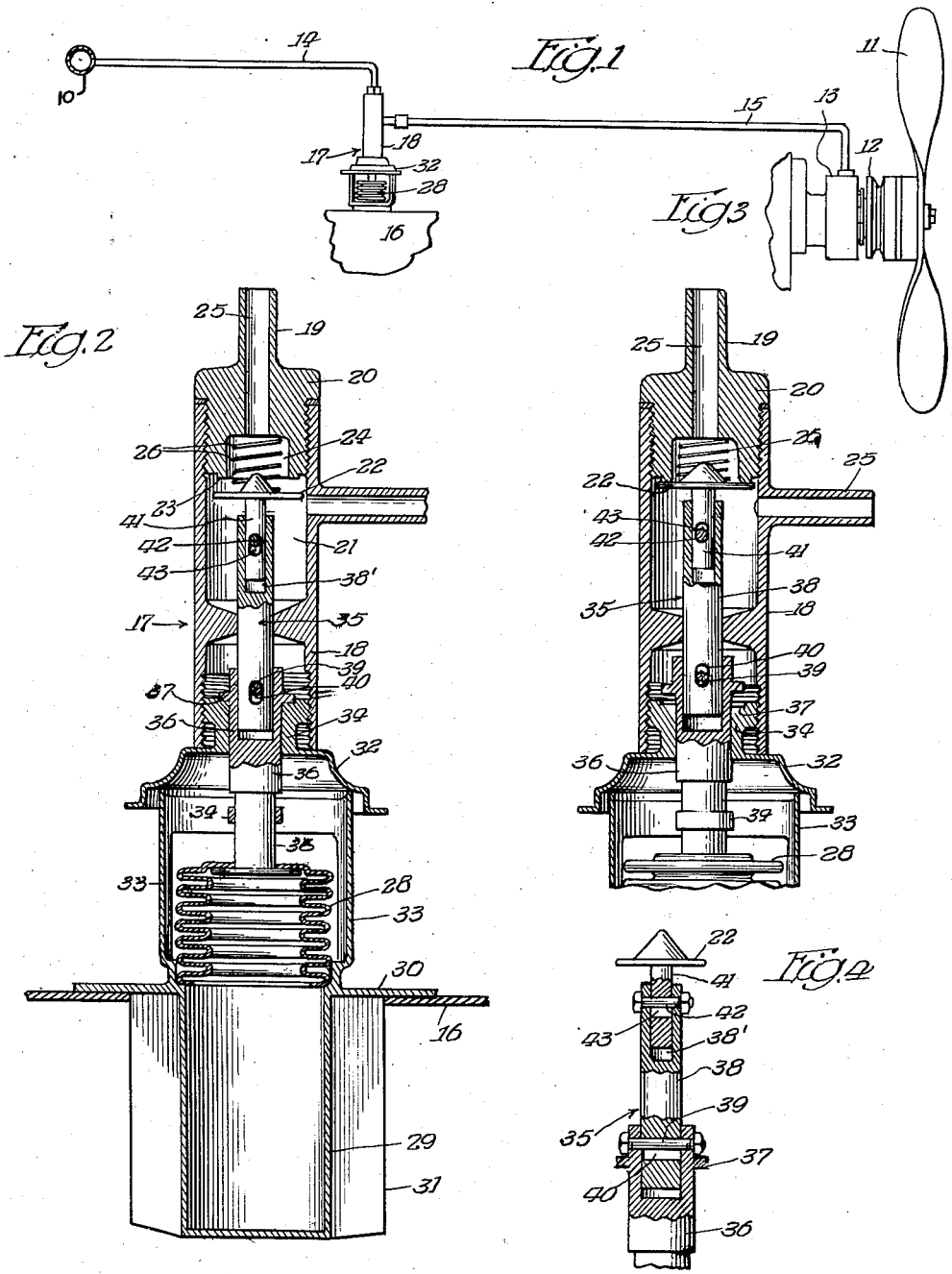
INVENTOR.
William L. Willcox
BY Fred Gerlach
his Atty.

United States Patent Office 2,829,837
Patented Apr. 8, 1958

2,829,837

THERMOSTATICALLY CONTROLLED VALVE FOR SUCTION RESPONSIVE DEVICES

William L. Willcox, Miami, Fla.

Application November 4, 1952, Serial No. 318,724

1 Claim. (Cl. 236—86)

The invention relates to valves for thermostatically controlling the operation of a vacuum-operable device, such as a valve for controlling by suction the operation of the fan-belt for cooling an internal combustion engine responsively to the temperature changes of the coolant circulated throughout the water jacket of the engine and the radiator.

One object of the invention is to provide a thermostatically controlled valve for controlling the vacuum operable device, which is accelerated in its opening and closing movements for accurately and efficiently controlling the suction within a desired predetermined range.

Another object of the invention is to provide a valve for this purpose which is simple in construction and efficient in operation.

Other objects of the invention will appear from the detailed description.

The invention consists in the several novel features hereinafter set forth and more particularly defined by the claim at the conclusion hereof.

In the drawings:

Fig. 1 is a diagrammatic illustration of a system applied to an engine and embodying the invention;

Fig. 2 is a longitudinal section of the valve in position for applying suction to the device for uncoupling the fan from its drive pulley;

Fig. 3 is a similar view showing the valve closed for the operation of the fan by its drive pulley;

Fig. 4 is a side elevation of the valve operating stem, parts being shown in section.

The invention is exemplified with an internal combustion engine provided with an intake manifold 10 for fuel which is subjected to the suction by the engine pistons, a fan 11 for cooling the engine, a belt pulley 12 movable into and out of driving relation with the hub of the fan, a vacuum operable device 13 for shifting the pulley 12 into and out of driving relation with the fan, a pipe 14 between the manifold 10 and the thermostatically controlled valve generally designated 17, a pipe 15 between said valve and the suction chamber in the device 13, and a radiator 16 through which water is circulated for cooling the engine.

Th valve 17 for controlling the suction in the device 13 comprises a cylindrical body or casing 18. Pipe 14 is communicatively connected to a nipple 19 on a plug 20 which is screw threaded to the upper end of a body 18 and above the chamber 21 in said body. Pipe 15 is communicatively connected to a nipple 25 on body 18 which communicates with chamber 21. A valve member 22 is adapted to engage a seat 23 on the lower end of plug 20 for cutting off the suction from pipe 14 through valve 17 and to pipe 15. A chamber 24 above seat 23 communicates with the bore in nipple 25 and contains a light spring 26 which is adapted to urge the valve member 22 away from its seat 23 when said member is moved from the seat a sufficient distance so that it will not be seated by suction in chamber 24.

The valve member is controlled by a thermostatic bellows 28 which has its lower end fixedly secured to a cup-shaped casing 29 which is adapted to extend into and has a flange 30 which is sealed to the wall of the casing of radiator 16. The gas in the bellows 28 is responsive to temperature changes in the coolant circulating through the engine jacket and the radiator. Fins 31 are provided on casing 29 for efficient heat transfer from the radiator to the gas in the bellows 28 and said casing. A shell 32 supported by legs 33 on casing 30, is provided with a screw threaded sleeve 34 to which the lower end of the valve body 18 is screw threaded for supporting the valve 17.

The valve member 22 is operable responsively to a predetermined temperature in the radiator to establish connection between pipes 14 and 15 for applying suction to the device 13 for uncoupling the fan 11 from its drive pulley, and for closing said valve member responsively to a predetermined decrease in temperature for cutting off the suction to the device 13 for coupling the fan 11 to its drive pulley by spring pressure when the suction is cut off.

In practice it has been found advantageous to accelerate the opening and closing movements of the valve for more accurately controlling its operation within the desired range of temperatures, and to definitely control the temperature differential between the opening and closing of the valve. For this purpose valve member 22 is operable by a stem, generally designated 35, which is composed of separately movable sections. A section 36 of the stem is fixedly secured to the top of bellows 28, is slidable in sleeve 34 and has an annular shoulder 37 which is normally seated on fixed sleeve 34. This shoulder limits the contraction of the bellows. A section 38 of the stem extends into a socket in and is slidably connected to section 36 by a cross-pin 39 which is fixed in stem section 36 and extends through a slightly elongated slot 40 in section 38. A stem section 41 on valve member 22 extends into and is slidable in a socket 38' in the upper end of stem section 38. A cross-pin 42 which may be fixed in section 38, extends through a slightly elongated slot 43 in section 41. This construction exemplifies an operating connection or stem composed of sections, between the bellows and valve member 22, which provides for lost motion between them and permits suction to suddenly move or accelerate the valve member to its seat during the closing of the valve and also for permitting the spring to suddenly move or accelerate the valve member away from its seat, during the opening of the valve responsively to the bellows.

The operation will be as follows: When the temperature in the engine cooling system is below a predetermined degree, for example, 165° F., the bellows will be contracted, shoulder 37 on stem section 38 will be seated on sleeve 34 and the valve member 22 will be open as shown in Fig. 2 and pressed downwardly by spring 26. The device 13 will then be operated by suction to uncouple belt pulley 12 from the hub of fan 11. The fan will remain stationary and the pulley will be idly driven by the engine. In this position the stem section 41 on valve member 22 will be pressed downwardly by spring 24 so that the upper end of slot 43 will rest on pin 42. The lower end of slot 43 in section 41 will engage pin 42 and will press stem section 38 downwardly so that the upper end of the slot 40 will engage or be close to pin 39. The pressure applied from spring 26 through the stem sections 41, 38 and 36 will urge the stem sections into the relation shown in Fig. 2. When the temperature in the cooling system rises, the bellows will expand and when it rises, for example, to 175° F., it will lift stem the bellows. This occurs because slot 43 in stem section 41, and valve member 22 and move valve member 22 toward seat 23. When the valve member 22 comes into close proximity to the seat 23, the suction in chamber 25 in plug 20 and the atmospheric pressure in the body 21 will cause the valve member to be suddenly impacted against the seat 23 and thereby the closing of said valve member is accelerated with respect to the movement of the bellows. This occurs because slot 43 in stem section 41 and slot 40 in stem section 38 permit valve member 22 to move independently of the bellows and stem section 36. Valve member 22 will then exclude suction from pipe 15. Member 22 and the stem sections will then be in the relation shown in Fig. 3. When the temperature of the cooling system is dropping, for example, from 175° F. to 165° F., the bellows will contract and lower stem section 36 and pin 39. Pin 39 engaging the lower end of slot 40 will lower stem section 38 and pin 42 engaging the lower end of slot 43 will lower stem sections 38 and 41 and member 22. This movement will start the valve member to its open position and as soon as said member is separated from its seat, spring 26 will move the valve member downwardly until the upper end of slot 43 engages pin 42, and the upper end of slot 40 engages pin 39. Spring 26, as soon as member 22 passes away from its seat 23, will accelerate the movement of member 22 with respect to the bellows during the opening of the valve, and slot 40 will permit stem section 38 to be lowered relatively to stem section 36. When the valve member is in its open position, suction will be applied to the device 13 to uncouple belt pulley 12 from fan 11 and stop the operation of the fan.

In this operation, the temperature differential between the closing and the opening of the valve member 21 may be directly determined by the amount of lost motion in the operating stem and the valve member opens and closes with a snap action assisted by suction in closing and by the spring with a snap action in opening the valve.

A characteristic attribute of the construction shown is that the casing 29 with fins 31 submerged in the coolant in the radiator or other section of the circulating system provides for efficient heat transfer to the gas in the bellows and that in the event that the bellows become punctured no coolant will escape from the bellows and the inherent spring in the bellows will close the valve member 22 for continuous operation of the fan.

The construction of the suction responsive device may be like that shown in my application for Patent No. 2,706,468, dated April 9, 1955.

The invention exemplifies an exceedingly simple and efficient thermostatically controlled valve for controlling suction to a suction responsive device with an accelerated movement relatively to the bellows or a snap action in opening or closing the valve. The invention also exemplifies a device of this character which includes a gas chamber which is structurally separate from the bellows and the bellows are outside of the radiator so that when the bellows are punctured the fan will not be stopped and coolant will not escape from the circulating system.

The invention is not to be understood as restricted to the details set forth since these may be modified within the scope of the appended claim without departing from the spirit and scope of the invention.

What I claim as new and desire to secure by Letters Patent is:

In a thermostatically controlled valve adapted to be interposed in a suction line leading from a source of variable sub-atmospheric pressure to a suction motor, a valve casing providing an internal valve chamber and having a port adapted to be connected to said source and defining a valve seat, a valve member disposed within said valve chamber and movable toward said seat and into engagement therewith under the influence of sub-atmospheric pressure maintained at said source; a spring applied to unseat said valve member; an expansible and contractible thermostat and a mechanical connection between said thermostat and said valve member for shifting the valve member responsive to expansion and contraction of the thermostat including a stem-section on and movable bodily with the thermostatic device, a stem section on and movable bodily with the valve member an intermediate stem-section slidably connected to the other sections, and pin-and-slot connections between said sections providing lost-motion between said sections for accelerating the seating of the valve member against the action of said spring and under the influence of sub-atmospheric pressure maintained at said source when the valve member is shifted by said thermostat into a position of predetermined proximity to said valve seat.

References Cited in the file of this patent
UNITED STATES PATENTS

| | | |
|---|---|---|
| 400,758 | Easton | Apr. 2, 1889 |
| 1,000,720 | Curtis | Aug. 15, 1911 |
| 1,931,863 | Fonseca | Oct. 24, 1933 |
| 1,990,219 | Baird | Feb. 5, 1935 |
| 2,022,709 | Embery | Dec. 3, 1935 |
| 2,230,777 | Hey | Feb. 4, 1941 |
| 2,584,419 | Branson | Feb. 5, 1952 |